US012748207B2

(12) United States Patent
Takamura et al.

(10) Patent No.: US 12,748,207 B2
(45) Date of Patent: Sep. 29, 2026

(54) SIGNAL PROCESSING DEVICE, SONIC SYSTEM AND VEHICLE

(71) Applicant: ROHM CO., LTD., Kyoto (JP)

(72) Inventors: Shogo Takamura, Kyoto (JP); Hideki Matsubara, Kyoto (JP); Takahiro Tsuboi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 141 days.

(21) Appl. No.: 18/617,568

(22) Filed: Mar. 26, 2024

(65) Prior Publication Data

US 2024/0329240 A1 Oct. 3, 2024

(30) Foreign Application Priority Data

Mar. 29, 2023 (JP) ................................ 2023-052933

(51) Int. Cl.
*G01S 15/08* (2006.01)
*G01S 15/931* (2020.01)

(52) U.S. Cl.
CPC ........... *G01S 15/08* (2013.01); *G01S 15/931* (2013.01)

(58) Field of Classification Search
CPC ........ G01S 15/08; G01S 15/931; G01S 7/527; G01S 7/521
See application file for complete search history.

(56) References Cited

U.S. PATENT DOCUMENTS 5,168,469 A * 12/1992 Liberto ................. G01S 15/102 73/606
5,323,361 A * 6/1994 Elle ....................... G01S 15/526 367/908
6,226,226 B1 * 5/2001 Lill ....................... G01S 15/931 367/98
6,870,792 B2 * 3/2005 Chiappetta ............ G01S 15/108 367/98
7,327,635 B2 * 2/2008 Knittel .................... G01S 7/527 367/98
7,486,590 B2 * 2/2009 Knittel .................... G01S 7/526 367/902
8,144,544 B2 * 3/2012 Daigle .................. G01S 7/5273 367/99

(Continued)

FOREIGN PATENT DOCUMENTS

CN 118731955 A * 10/2024 ............. G01S 7/521
JP 2011033486 A * 2/2011

(Continued)

*Primary Examiner* — Daniel Pihulic
(74) *Attorney, Agent, or Firm* — Fish & Richardson P.C.

(57) ABSTRACT

The present disclosure provides a signal processing device. The signal processing device includes: a transmission signal generation unit, configured to generate a transmission signal for a transmitted wave of sound wave; a reception signal output unit, configured to output a received signal based on a received wave of sound wave; and a reflected wave detection unit. The reflected wave detection unit is configured to detect a first reflected wave of the transmitted wave that may be included in the received wave based on a first timing when an envelope detection signal, which is a signal obtained by envelope detection of an absolute value of the received signal during a reverberation period in which a reverberation of the transmitted wave remains, is lower than a first threshold value.

5 Claims, 6 Drawing Sheets

(56) References Cited

U.S. PATENT DOCUMENTS

| | | | | |
|---|---|---|---|---|
| 8,149,648 B2 * | 4/2012 | Daigle | G01S 7/4021 | 367/98 |
| 8,670,289 B2 * | 3/2014 | Niemz | G01S 15/931 | 367/98 |
| 8,854,921 B2 * | 10/2014 | Karl | G01S 15/10 | 367/100 |
| 2003/0039171 A1 * | 2/2003 | Chiapetta | G01S 15/88 | 367/98 |
| 2009/0257310 A1 * | 10/2009 | Daigle | G01S 7/5273 | 367/87 |
| 2013/0033964 A1 * | 2/2013 | Karl | G01S 15/10 | 367/100 |
| 2024/0329240 A1 * | 10/2024 | Takamura | G01S 15/931 | |

FOREIGN PATENT DOCUMENTS

| | | | |
|---|---|---|---|
| JP | 2024141342 A * | 10/2024 | G01S 7/521 |
| WO | WO 2020/004609 | 1/2020 | |

* cited by examiner

SIGNAL PROCESSING DEVICE, SONIC SYSTEM AND VEHICLE

TECHNICAL FIELD

The present disclosure relates to a signal processing device processing a sound wave transmission signal for a transmitted wave of sound wave, a sonic system having the signal processing device, and a vehicle having the sonic system.

BACKGROUND

Conventionally, there are ultrasonic sensors which, by means of generating ultrasonic waves and measuring time-of-flight (TOF) until a reflected wave from an obstacle returns, measures a distance from the obstacle. Such ultrasonic sensors are mostly mounted in vehicles, and are, for examples, in-vehicle distance sonars (e.g., referring to patent publication 1).

PRIOR ART DOCUMENT

Patent Publication

[Patent publication 1] International Publication No. 2020/004609

DETAILED DESCRIPTION OF THE EMBODIMENTS

Details of the embodiments are given with the accompanying drawings below. In an example, it is assumed that, an ultrasonic system of the first embodiment and an ultrasonic system of a second embodiment to be described below are mounted in a vehicle and can be used to measure a distance between the vehicle and a target object for the use of an alarm function, an auto-brake function and an auto-parking function.

In the description below, sometimes an ultrasonic system of a first embodiment and an ultrasonic system of a second embodiment are collectively referred to as an ultrasonic system of an embodiment.

Figure 1:
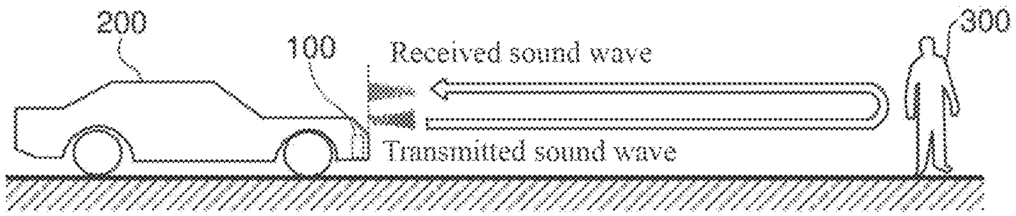
FIG. 1 is a schematic diagram of a vehicle mounted with an ultrasonic system according to an embodiment and a target object.

FIG. 1 shows a schematic diagram of a vehicle 200 mounted with an ultrasonic system 100 according to an embodiment and a target object (obstacle) 300. An ultrasonic wave sent from the ultrasonic system 100 of the embodiment is reflected by the target object 300, and becomes a reflected wave that is received by the ultrasonic system 100 of the embodiment.

First Embodiment

Figure 2:
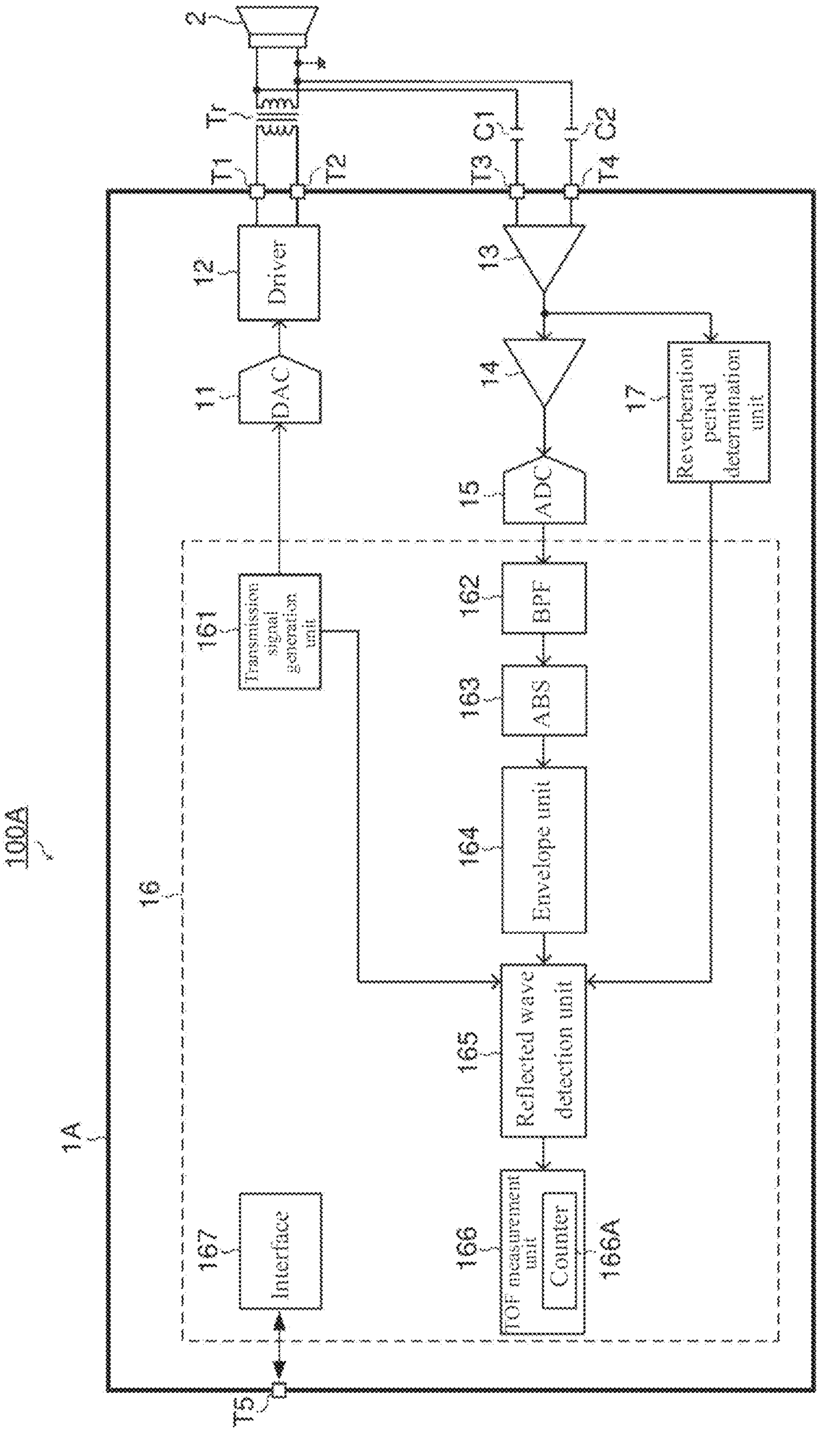
FIG. 2 is a diagram of a configuration of an ultrasonic system according to a first embodiment.

FIG. 2 shows a diagram of a configuration of an ultrasonic system 100A according to the first embodiment (to be referred to as "the ultrasonic system 100A" below).

The ultrasonic system 100A includes a signal processing device 1A, a transformer Tr, capacitors C1 and C2, and an ultrasonic transmitting/receiving device 2. The ultrasonic transmitting/receiving device 2 is connected in an externally installed manner to the signal processing device 1A via the transformer Tr and the capacitors C1 and C2. In addition, the transformer Tr and the capacitors C1 and C2 are not necessarily provided.

The signal processing device 1A is a semiconductor integrated circuit device. The signal processing device 1A includes a digital-to-analog converter (DAC) 11, a driver 12, a low-noise amplifier (LNA) 13, a programmable gain amplifier (PGA) 14, an analog-to-digital converter (ADC) 15, a digital processing unit 16, a reverberation period determination unit 17, and external terminals T1 to T5.

The DAC 11 performs digital-to-analog conversion on a transmission signal for a transmitted wave of sound wave output by a transmission signal generation unit 161 included in the digital processing unit 16 to convert it from a digital signal into an analog signal, and outputs the digital-to-analog converted signal to the driver 12.

Output terminals of a differential pair of the driver 12 are connected to a primary side of the transformer Tr via the external terminals T1 and T2. A secondary side of the transformer Tr is connected to the ultrasonic transmitting/receiving device 2. The driver 12 drives the ultrasonic transmitting/receiving device 2 based on the output signal of the DAC 11.

The ultrasonic transmitting/receiving device 2 includes a piezoelectric element (not shown) to transmit and receive ultrasonic waves. That is to say, the ultrasonic transmitting/receiving device 2 is an ultrasonic transmitting/receiving device that functions as both an acoustic source and a receiving unit. The ultrasonic transmitting/receiving device 2 can be configured to include a piezoelectric element commonly used for sound wave transmission and sound wave reception, or can be configured to include a piezoelectric element used exclusively for sound wave transmission and a piezoelectric element used exclusively for sound wave reception.

Input terminals of a differential pair of the LNA 13 are connected to the secondary side of the transformer Tr via the external terminals T3 and T4 and the capacitors C1 and C2. The LNA 13 amplifiers and converts differential signals received from the external terminals T3 and T4 into a single-ended signal that is then output to the PGA 14. Moreover, the LNA 13 also performs clipping to ensure that the single-ended signal does not go beyond a predetermined level. The PGA 14 amplifies and outputs the signal received from the LNA 13 to the ADC 15. The ADC 15 performs analog-to-digital conversion on an output signal of the PGA 14 to convert it from an analog signal into a digital signal, and outputs the analog-to-digital converted signal to a band pass filter (BFP) 162.

The digital processing unit 16 includes the transmission signal generation unit 161, the BPF 162, an absolute value processing unit (ABS) 163, an envelope unit 164, a reflected wave detection unit 165, a time-of-flight (TOF) measurement unit 166, an interface 167 and a resonance frequency measurement unit 168.

The transmission signal generation unit 161 is configured to generate a transmission signal for a transmitted wave of ultrasonic wave. More specifically, in the transmission signal generation unit 161, if a sound wave transmission instruction is received from an electronic control unit (ECU, not shown) mounted in the vehicle 200 (referring to FIG. 1) via the interface 167, a transmission signal for a transmitted wave including a predetermined number of waves is generated and output to the DAC 11.

The BPF 162 allows only a predetermined frequency band in the output signal of the ADC 15 to pass through, and attenuates a frequency band other than the predetermined frequency band. The BPF 162 has a frequency characteristic determined according to a frequency setting of the transmission signal for a transmitted wave. For example, the predetermined frequency band is set to be consistent with a frequency band of the transmission signal for a transmitted wave.

The absolute value processing unit 163 performs absolute value processing on an output signal of the BPF 162. That is to say, the absolute value processing unit 163 performs inversion on a negative output signal of the BPF 162 to convert it into a positive signal.

The envelope unit 164 performs envelope detection on an output signal of the absolute value processing unit 163 to obtain a signal.

Figure 3:
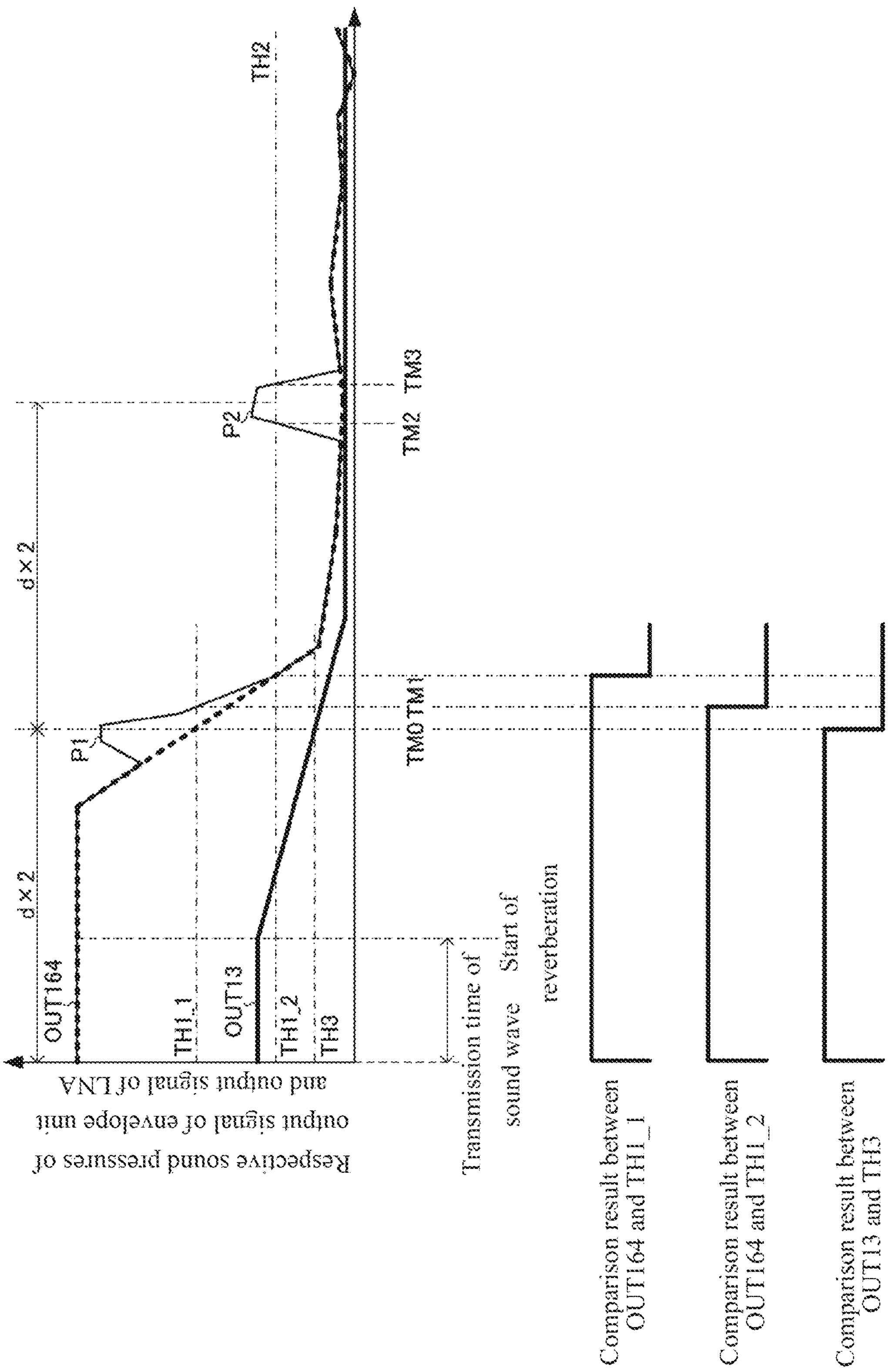
FIG. 3 is a diagram of an example of respective sound pressures of an output signal of an envelope unit and an output signal of a low noise amplifier (LNA) in individual cases where a target object is present at a close distance and where a target object is not present at a close distance.

FIG. 3 shows a diagram of an example of respective sound pressures of an envelope detection signal output from an envelope unit and an output signal of a LNA 13 in individual cases where the target object 300 is present at a close distance and where the target object 300 is not present at a close distance. In FIG. 3, the envelope detection signal when the target object 300 is not present at a close distance is depicted by a thick dotted line, the envelope detection signal when the target object 300 is present at a close distance is depicted by a thin solid line, and an output signal OUT13 of the LNA 13 is depicted by a thick solid line. The horizontal axis in FIG. 3 represents an elapsed time from the transmission of sound wave, and the vertical axis in FIG. 3 represents the respective sound pressures of the envelope detection signals output from the envelope unit 164 and the output signal of the LNA 13. The elapsed time from the transmission of sound wave is directly proportional to a distance between the ultrasonic system 100A and the target object 300.

Figure 4:
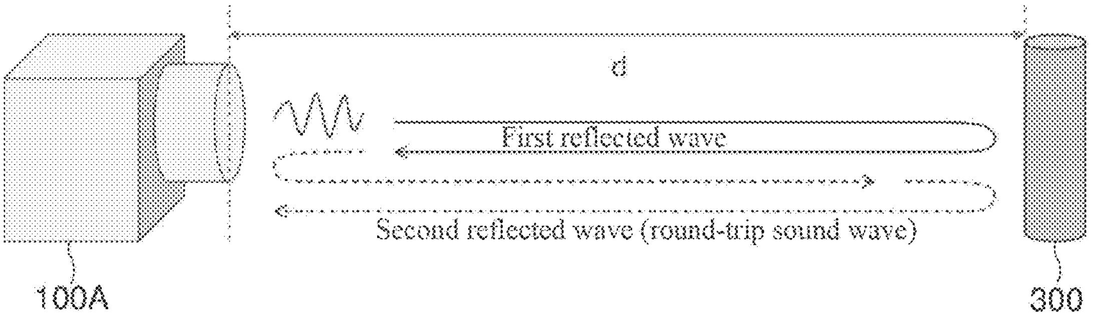
FIG. 4 is a brief diagram of a first reflected wave and a second reflected wave.

As shown in FIG. 4, a first peak P1 in FIG. 3 is a peak generated by a first reflected wave, which is reflected by the target object 300 at a close distance and returned to the ultrasonic system 100A. As shown in FIG. 4, a second peak P2 in FIG. 3 is a peak generated by a second reflected wave, which is the first reflected wave reflected by the target object 300 present at a close distance and returned to the ultrasonic system 100A, and further reflected by the ultrasonic system 100A and then again reflected by the target object 300 and returned to ultrasonic system 100A.

The reflected wave detection unit 165 shown in FIG. 1 is configured to detect the first reflected wave of the transmitted wave that may be included in a received wave based on a first timing TM1, when the envelope detection signal output from the envelope unit 164 during a reverberation period in which a reverberation of the transmitted wave remains is lower than a first threshold value TH1. More specifically, the reflected wave detection unit 165 is configured to detect the first reflected wave of the transmitted wave that may be included in the received wave when the first timing TM1 is later than a reference timing TM0. As such, the ultrasonic system 100A is able to detect the target object 300 located at a close distance.

In case where the target object 300 is present at a close distance, when the first peak P1 occurs during the reverberation period changes according to the distance between the ultrasonic system 100A and the target object 300. Thus, it is ideal for the first threshold value TH1 to include a plurality of set values with different values. In the example shown in FIG. 3, the first threshold value TH1 includes a set value TH1_1 and a set value TH1_2.

In the example shown in FIG. 3, the reflective wave detection unit 165 detects the first reflected wave of the transmitted wave according to the set value TH1_1. In case of the set value TH1_2, since the reference timing TM0 is consistent with the first timing TM1 (omitted from FIG. 3), detection for the first reflected wave of the transmitted wave cannot be performed according to the set value TH1_2.

The reflective wave detection unit 165 can also be configured to detect the first reflected wave of the transmitted wave, and detect a second timing TM2 at which the sound pressure of the envelope detection signal output from the envelope unit 164 exceeds a second threshold value TH2 as a timing related to a distance away from a target object when the sound pressure of the envelope detection signal output from the envelope unit 164 exceeds the second threshold value TH2 when the reverberation period ends. In addition, in the example shown in FIG. 3, the set value TH1_2 is consistent with the second threshold value TH2; however, the set value TH1_2 and the second threshold value TH2 can also be values different from each other.

In the ultrasonic system 100A, with an intermediate timing between the second timing TM2 and a third timing TM3 at which the sound pressure of the envelope detection signal output from the envelope unit 164 is again lower than the second threshold TH2 after it exceeds the second threshold value TH2, a time from the start timing of a sound wave transmission period to the intermediate timing is used as a time corresponding to a four times a distance d between the ultrasonic system 100A and the target object 300. In addition, different from this embodiment, for example, a time from the start timing of the sound wave transmission period to the second timing TM2 can also be used as a time corresponding to four times the distance d between the ultrasonic system 100A and the target object 300.

Figure 5:
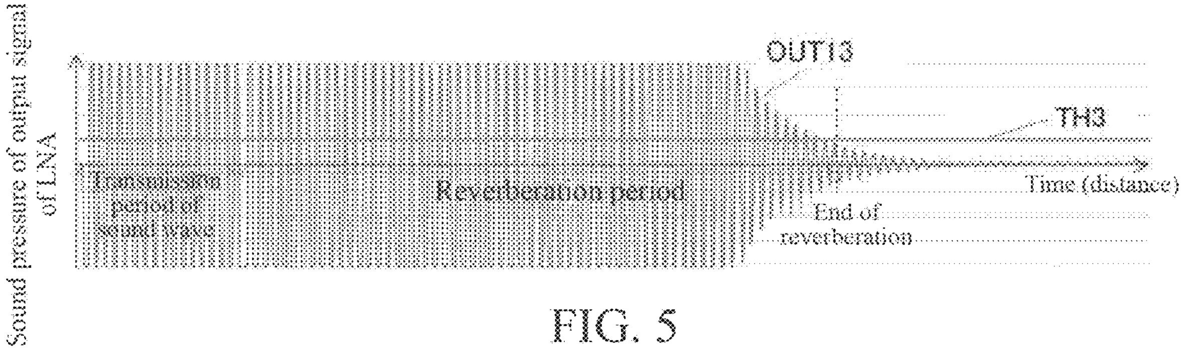
FIG. 5 is a diagram of an output signal of an LNA and a reverberation determination threshold value.

The reverberation period determination unit 17 compares the output signal OUT13 of the LNA 13 with a third threshold value TH3. As shown in FIG. 5, if a state in which an amplitude of the output signal OUT13 of the LNA 13 is lower than the third threshold value TH3 continues for a time over a predetermined period of the output signal OUT13 of the LNA 13, it is determined that the reverberation period has ended. In addition, the start timing of the reverberation period is a timing at which outputting of the transmission signal from the transmission signal generation unit 161 ends, that is, an end timing of the sound wave transmission period in FIG. 3. The predetermined period can be set to any value as desired by the signal processing device 1A by using the external terminal T5 and the interface 167.

Figure 6:
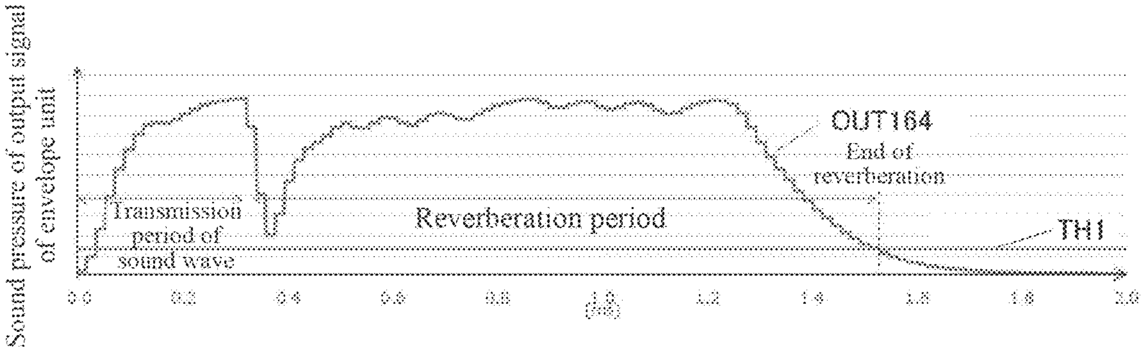
FIG. 6 is a diagram of an output signal of an envelope unit and a reverberation determination threshold value.

In addition, the reflected wave detection unit 165 determines the end of the reverberation period by using the envelope detection signal output from the envelope unit 164. That is to say, the reflected wave detection unit 165 compares an envelope detection signal OUT164 output from the envelope unit 164 with the first threshold value TH1. If the envelope detection signal OUT164 output from the envelope unit 164 changes to be lower than the first threshold value TH1 after the sound wave transmission period shown in FIG. 6, it is determined that the reverberation period has ended.

An example of a method in which the reflected wave detection unit 165 detects that the first timing TM1 is later than the reference timing TM0 is described.

In a first example, a difference between the end timing of the reverberation period obtained according to a comparison result between the envelope detection signal OUT164 output from the envelope unit 164 and the set value TH1_1, and the end timing of the reverberation period obtained according to a comparison result between the envelope detection signal OUT164 output from the envelope unit 164 and the set value TH1_2, is determined.

If the difference between the end timing of the reverberation period obtained according to the comparison result between the envelope detection signal OUT164 output from the envelope unit 164 and the set value TH1_1 and the end timing of the reverberation period obtained according to the comparison result between the envelope detection signal OUT164 output from the envelope unit 164 and the set value TH1_2 is greater than a predetermined value, the reflected wave detection unit 165 determines that the first timing TM1 is not later than the reference timing TM0.

On the other hand, if the difference between the end timing of the reverberation period obtained according to the comparison result between the envelope detection signal OUT164 output from the envelope unit 164 and the set value TH1_1 and the end timing of the reverberation period obtained according to the comparison result between the envelope detection signal OUT164 output from the envelope unit 164 and the set value TH1_2 is lower than a predetermined value, the reflected wave detection unit 165 determines that the first timing TM1 is later than the reference timing TM0.

In a second example, a difference between the end timing of the reverberation period obtained according to a comparison result between the envelope detection signal OUT164 output from the envelope unit 164 and the set value TH1_1, and the end timing of the reverberation period obtained according to a comparison result between the output signal OUT13 of the LNA 13 and the third threshold value TH3, is determined.

A level of the output signal OUT13 of the LNA 13 including the reflected wave reflected by the target object 300 located at a close distance is lower than the third threshold value TH3. Thus, regardless of the presence or absence of the target object 300 located at a short distance, the timing at which a state in which the output signal OUT13 of the LNA 13 continues to be below the third threshold TH3 for one cycle or more of the output signal OUT13 of the LNA 13 remains almost the same. Thus, the following determination can be concluded.

If the end timing of the reverberation period obtained according to the comparison result between the envelope detection signal OUT164 output from the envelope unit 164 and the set value TH1_2 is later than the end timing of the reverberation period obtained according to the comparison result between the output signal OUT13 of the LNA 13 and the third threshold value TH3 by more than a predetermined time, the reflected wave detection unit 165 determines that the first timing TM1 is later than the reference timing TM0.

On the other hand, if the end timing of the reverberation period obtained according to the comparison result between the envelope detection signal OUT164 output from the envelope unit 164 and the set value TH1_2 is not later than the end timing of the reverberation period obtained according to the comparison result between the output signal OUT13 of the LNA 13 and the third threshold value TH3 by more than the predetermined time, the reflected wave detection unit 165 determines that the first timing TM1 is not later than the reference timing TM0.

The TOF measurement unit 166 uses a counter 166A to measure a TOF from when the ultrasonic wave is sent to when the reflected wave reflected by the target object 300 is received.

For example, the interface 167 communicates with an ECU (not shown) mounted in the vehicle 200 (referring to FIG. 1) via the external terminal T5 according to a Local Interconnect Network (LIN).

Second Embodiment

Figure 7:
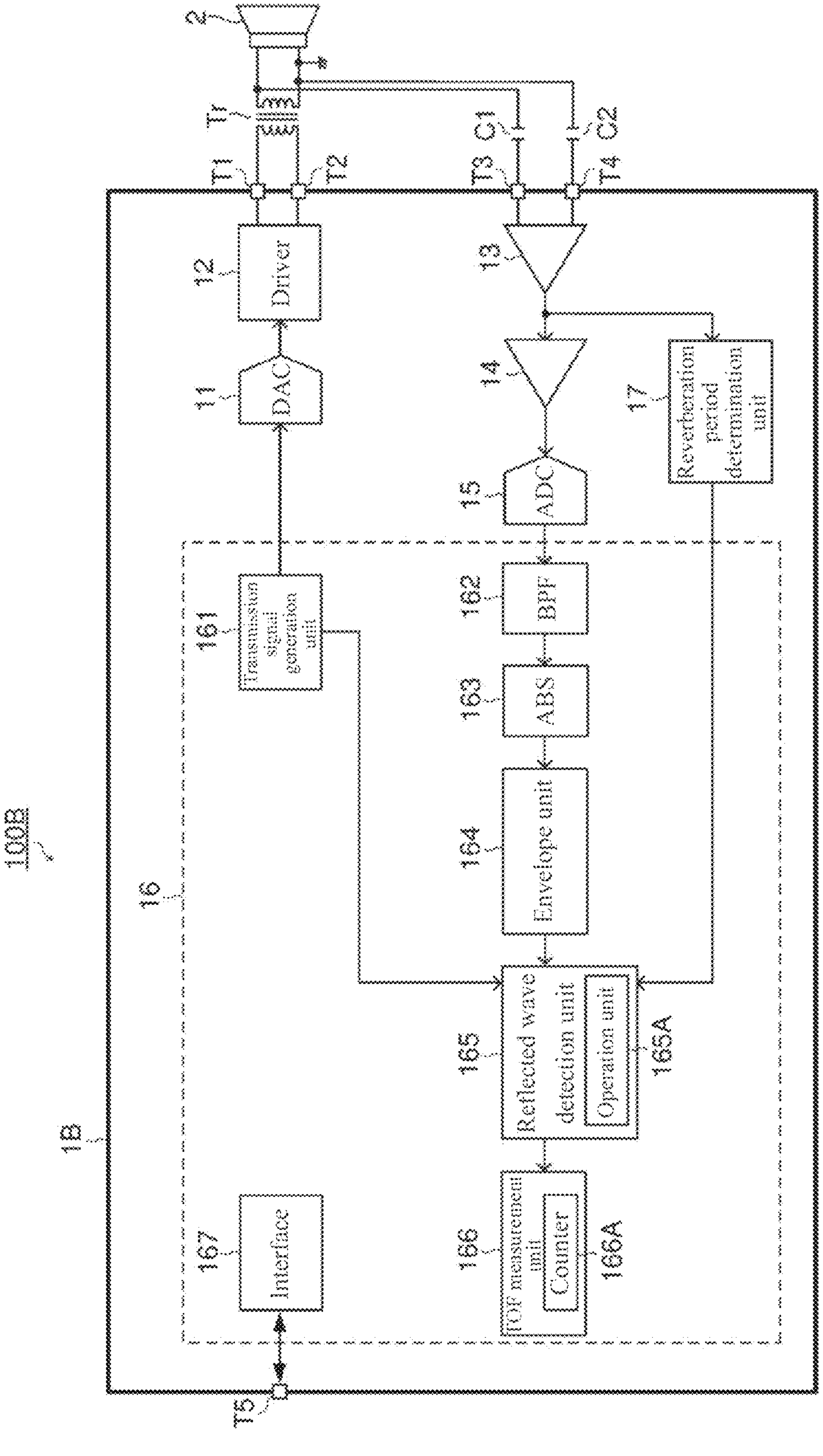
FIG. 7 is a diagram of a configuration of an ultrasonic system according to a second embodiment.

FIG. 7 shows a diagram of a configuration of an ultrasonic system 100B according to the second embodiment (to be referred to as "the ultrasonic system 100B" below).

The ultrasonic system 100B includes a signal processing device 1B, a transformer Tr, capacitors C1 and C2, and an ultrasonic transmitting/receiving device 2. The ultrasonic transmitting/receiving device 2 is connected in an externally installed manner to the signal processing device 1A via the transformer Tr and the capacitors C1 and C2. In addition, the transformer Tr and the capacitors C1 and C2 are not necessarily provided.

The signal processing device 1B is a semiconductor integrated circuit device. In the signal processing device 1B, except that processing details performed in the reflective wave detection unit 165 are different from those of the signal processing device 1A are different, the rest are the same as those of the signal processing device 1A.

In this embodiment, the reflected wave detection unit 165 includes an operation unit 165A. The operation unit 165A performs differentiation and integration operations.

The reflected wave detection unit 165 is configured to detect the first reflected wave of the transmitted wave that may be included in the received wave based on a positive time rate of change of the envelope detection signal output by the envelope unit 165 during the reverberation period in which a reverberation of the transmitted wave remains. The time rate of change of the envelope detection signal output from the envelope unit 164 is obtained by the operation unit 165 by performing a differentiation operation on the envelope detection signal output from the envelope unit 164.

In this embodiment, when the time rate of change of the envelope detection signal output from the envelope unit 164 is positive, a differential value of the envelope detection signal output from the envelope unit 164 is converted to +1. Moreover, when the time rate of change of the envelope detection signal output from the envelope unit 164 is 0, the differential value of the envelope detection signal output from the envelope unit 164 is converted to 0. Moreover, when the time rate of change of the envelope detection signal output from the envelope unit 164 is negative, the differential value of the envelope detection signal output from the envelope unit 164 is converted to −1.

Figure 8:
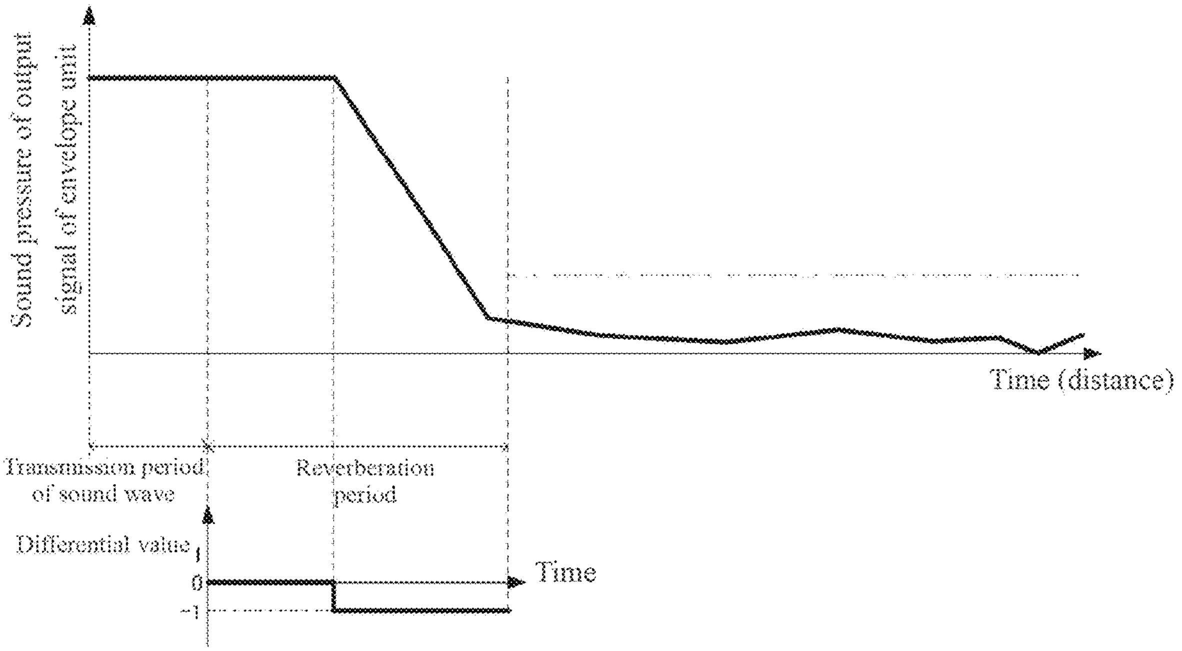
FIG. 8 is a diagram of an example of a sound pressure of an output signal of an envelope unit and a differential value in a case where a target object is not present at a close distance.
Figure 9:
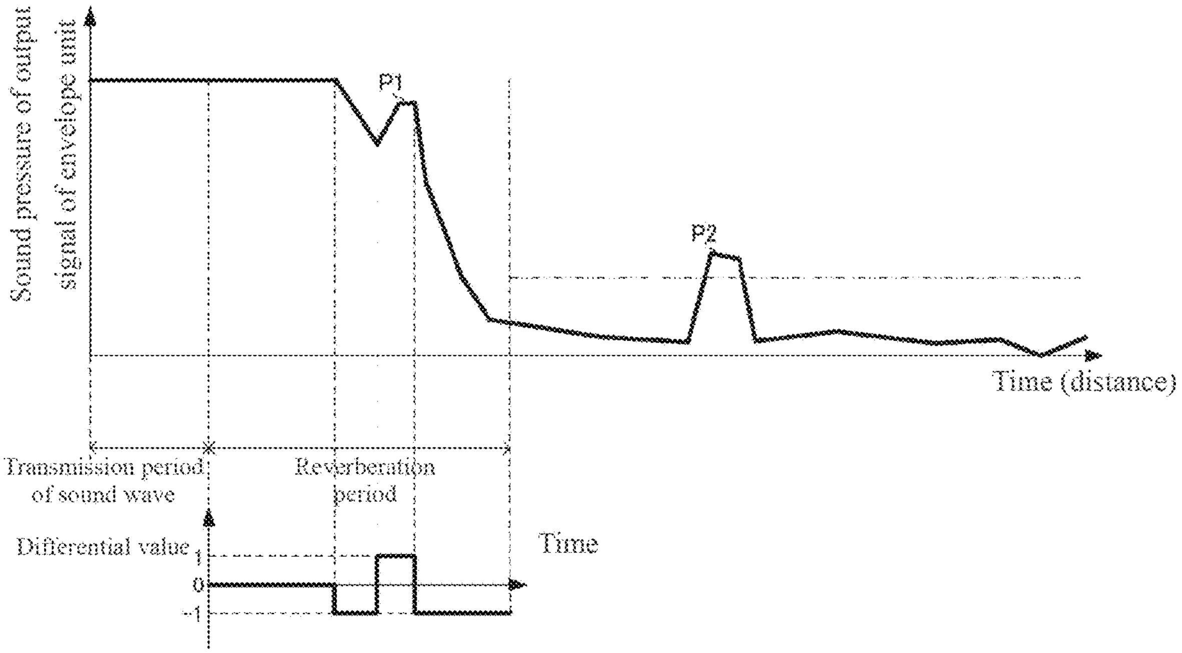
FIG. 9 is a diagram of an example of a sound pressure of an output signal of an envelope unit and a differential value in a case where a target object is present at a close distance.

Herein, FIG. 8 shows a diagram of an example of a sound pressure of an output signal of an envelope unit and a differential value in a case where a target object is not present at a close distance. FIG. 9 shows a diagram of an example of a sound pressure of an output signal of an envelope unit and a differential value in a case where a target object is present at a close distance.

The operation unit 165A performs an integration operation only on +1 among the three values of the differential values of the envelope detection signal output from the envelope unit 164. The reflected wave detection unit 165 is configured to detect the first reflected wave of the transmitted wave that may be included in the received wave if a value (an integral value) obtained from the integration operation performed by the operation unit 165A exceeds a threshold value. As such, the ultrasonic system 100B is able to detect the target object 300 located at a close distance.

In the ultrasonic system 100B, with the timing at which the integral value exceeds the threshold value, the start timing of the reverberation period to the timing at which the integral value exceeds the threshold value is used as a time corresponding to a twice a distance d between the ultrasonic system 100A and the target object 300. Moreover, in this embodiment, similar to the first embodiment, the reflected wave detection unit 165 detects the second timing TM2 as a timing related to a distance away from a target object.

Other

Moreover, in addition to the embodiments, various modifications may be applied to the configurations of the present disclosure without departing from the scope of the inventive subject thereof. It should be understood that all aspects of the embodiment are exemplary rather than restrictive, and it should also be understood that the technical scope of the present disclosure is represented by way of the claims but not the non-limiting embodiments, including all variations made within equivalent meanings and scopes accorded with the claims.

In the embodiments, the ultrasonic system 100 that sends ultrasonic waves (sound waves at a high vibration frequency beyond audible sounds) is described; however, the present disclosure is also applicable to sound wave systems that send sound waves other than ultrasonic waves.

Note

A note is attached to the present disclosure to show specific configuration examples of the embodiments above.

A signal processing device (100A) according to an aspect of the present disclosure is configured as (a first configuration) comprising: a transmission signal generation unit (161), configured to generate a transmission signal for a transmitted wave of sound wave; a reception signal output unit (13 to 15), configured to output a received signal based on a received wave of sound wave; and a reflected wave detection unit (165), wherein the reflected wave detection unit is configured to detect a first reflected wave of the transmitted wave that may be included in the received wave based on a first timing when an envelope detection signal, which is a signal obtained by envelope detection of an absolute value of the received signal during a reverberation period in which a reverberation of the transmitted wave remains, is lower than a first threshold value.

The signal processing device of the first configuration can also be configured as (a second configuration), wherein the reflected wave detection unit is configured to detect the first reflected wave when the first timing is later than a reference timing.

The signal processing device of the first or second configuration can also be configured as (a third configuration), wherein the first threshold value includes a plurality of set values with different values.

The signal processing device of any one of the first to third configurations can also be configured as (a fourth configuration), wherein the reflected wave detection unit is configured to detect the first reflected wave, and detect a second timing at which the envelope detection signal exceeds a second threshold value as a timing related to a distance away from a target object when the envelope detection signal exceeds the second threshold value, wherein the envelope detection signal is obtained from envelope detection of the absolute value of the received signal when the reverberation period ends.

A signal processing device (100B) according to another aspect of the present disclosure is configured as (a fifth configuration) comprising: a transmission signal generation unit (161), configured to generate a transmission signal for a transmitted wave of sound wave; a reception signal output unit (13 to 15), configured to output a received signal based on a received wave of sound wave; and a reflected wave detection unit (165), wherein the reflected wave detection unit is configured to detect a first reflected wave of the transmitted wave that may be included in the received wave based on a positive time rate of change of an envelope detection signal, which is a signal obtained by envelope detection of an absolute value of the received signal in a reverberation period in which a reverberation of the transmitted wave remains.

The signal processing device of the fifth configuration can also be configured as (a sixth configuration), wherein the reflected wave detection unit is configured to detect the first reflected wave based on an integral value of the positive time rate of change.

The signal processing device of the fifth or sixth configuration can also be configured as (a seventh configuration), wherein the reflected wave detection unit is configured to calculate a distance away from a target object based on the first reflected wave.

A sonic system (100A, 100B) of the present disclosure is configured as (an eighth configuration) comprising: the signal processing device of any one of the first to seventh configurations; and a sound wave transmitting/receiving device (2) configured to be connected directly or indirectly to the signal processing device.

A vehicle (200) of the present disclosure is configured as (a ninth configuration) comprising the sonic system of the eighth configuration.

The invention claimed is:

1. A signal processing device, comprising:

a transmission signal generation unit, configured to generate a transmission signal for a transmitted wave of sound wave;

a reception signal output unit, configured to output a received signal based on a received wave of sound wave; and a reflected wave detection unit, wherein the reflected wave detection unit is configured to detect a first reflected wave of the transmitted wave that is included in the received wave based on a positive time rate of change of an envelope detection signal, which is a signal obtained by envelope detection of an absolute value of the received signal in a reverberation period in which a reverberation of the transmitted wave remains, wherein the reflected wave detection unit is configured to detect the first reflected wave based on an integral value of the positive time rate of change, and wherein the integral value exceeds a threshold value.

2. The signal processing device of claim 1, wherein the reflected wave detection unit is configured to calculate a distance away from a target object based on the first reflected wave.

3. A sonic system, comprising:

the signal processing device of claim 1; and a sound wave transmitting/receiving device configured to be connected directly or indirectly to the signal processing device.

4. A vehicle, comprising the sonic system of claim 3.

5. The signal processing device of claim 1, wherein the reflected wave detection unit is configured to:

detect the first reflected wave; and detect a second timing at which the envelope detection signal exceeds a second threshold value as a timing related to a distance away from a target object when the envelope detection signal exceeds the second threshold value, wherein the envelope detection signal is obtained from envelope detection of the absolute value of the received signal when the reverberation period ends.

* * * * *